Patented July 24, 1923.

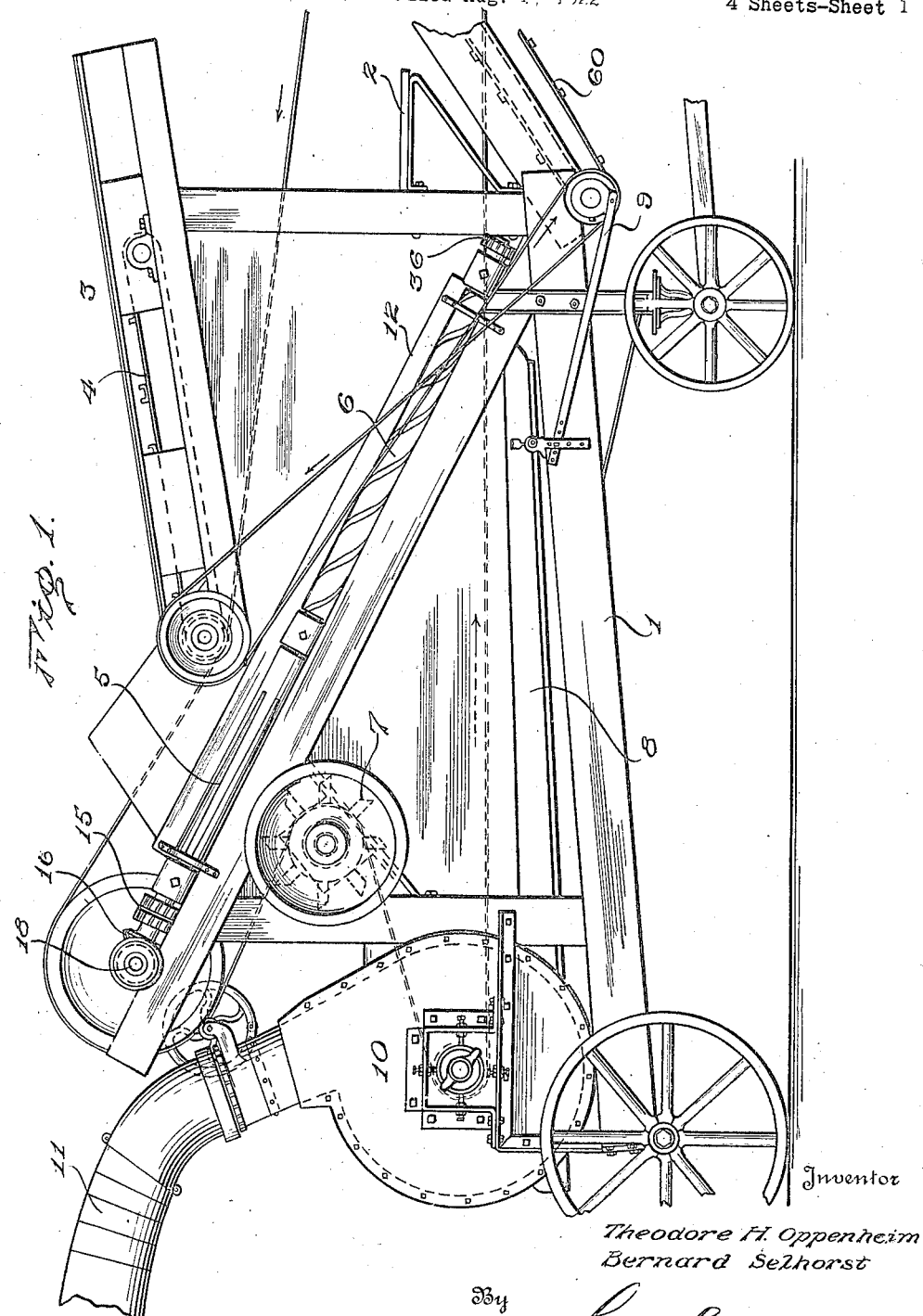

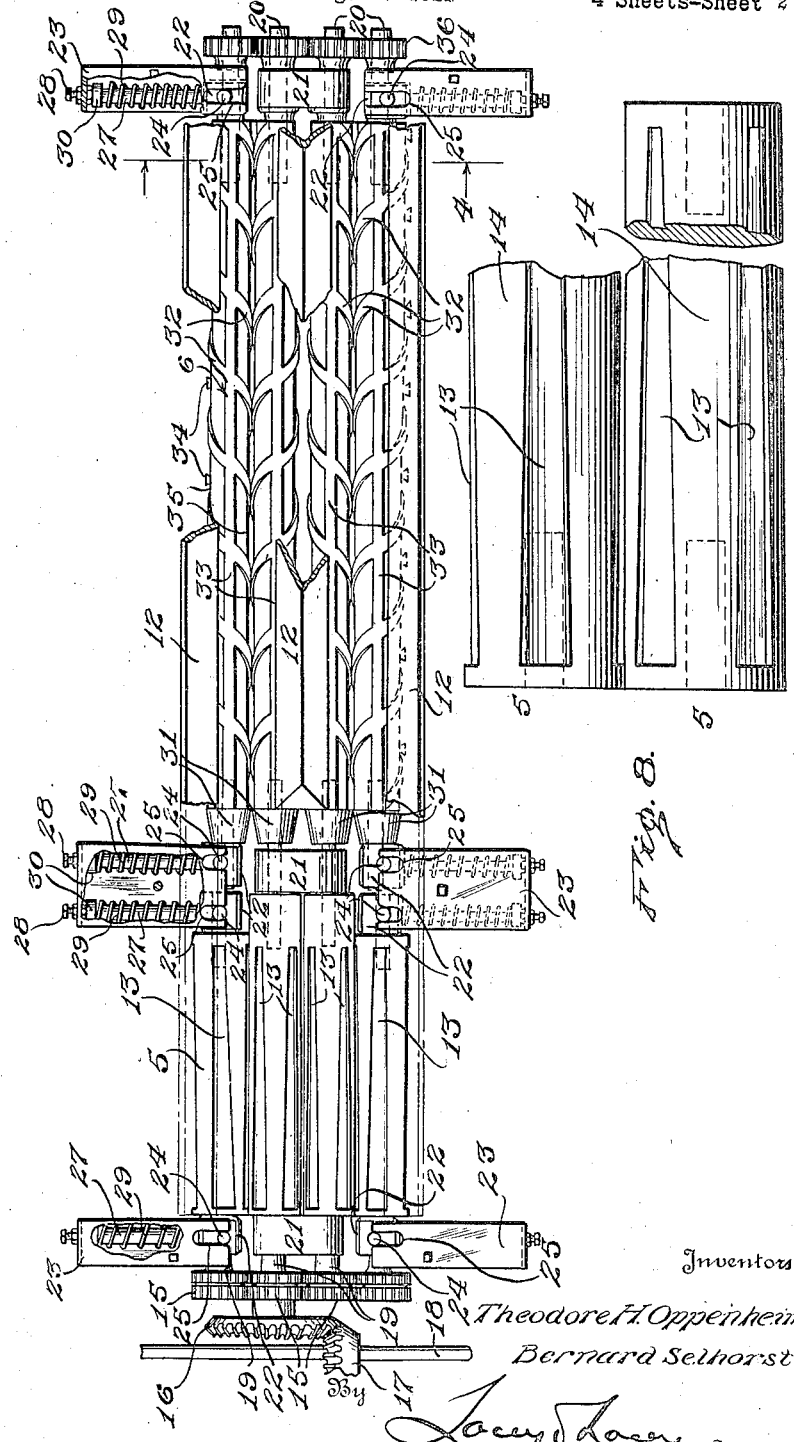

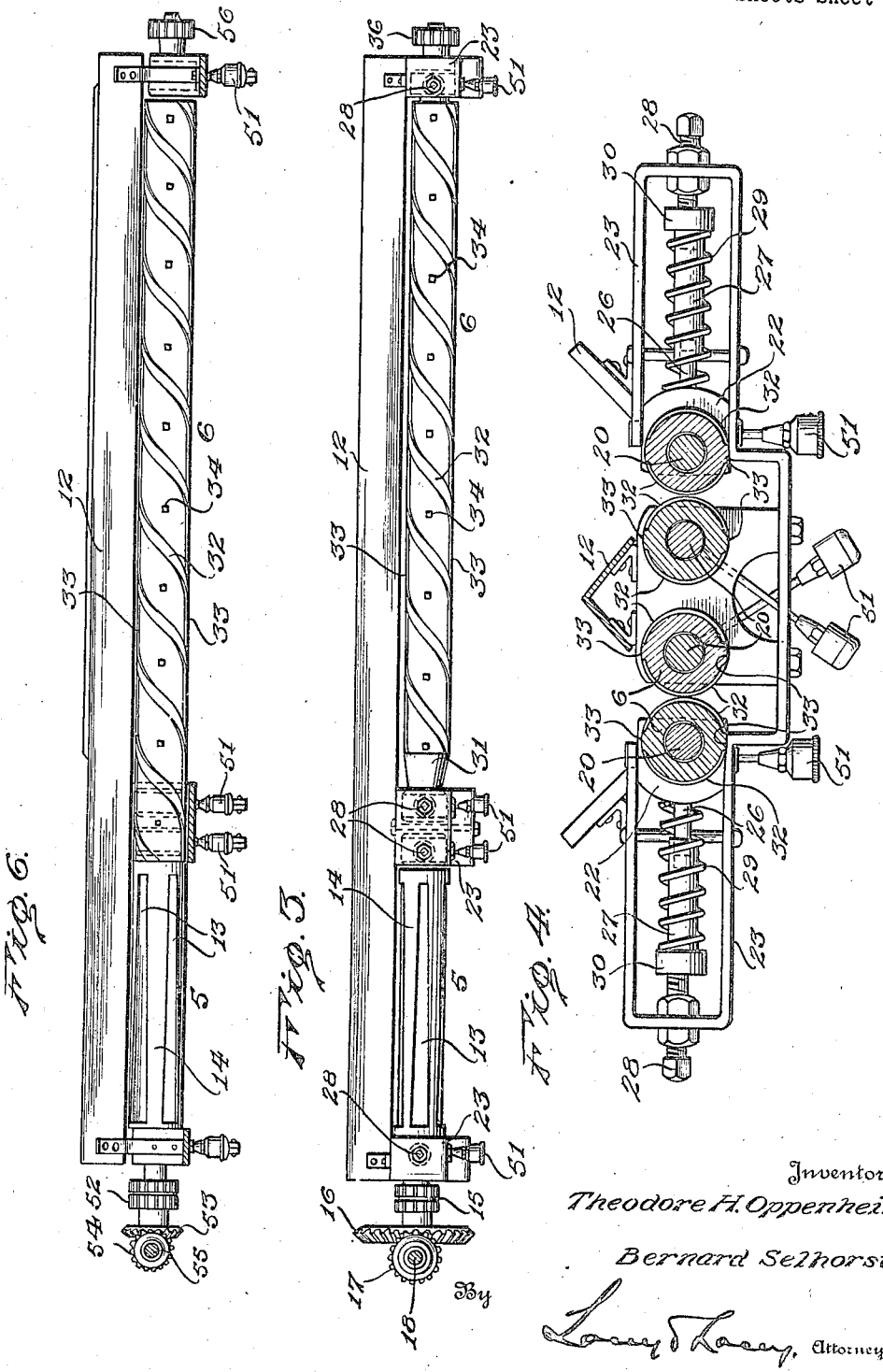

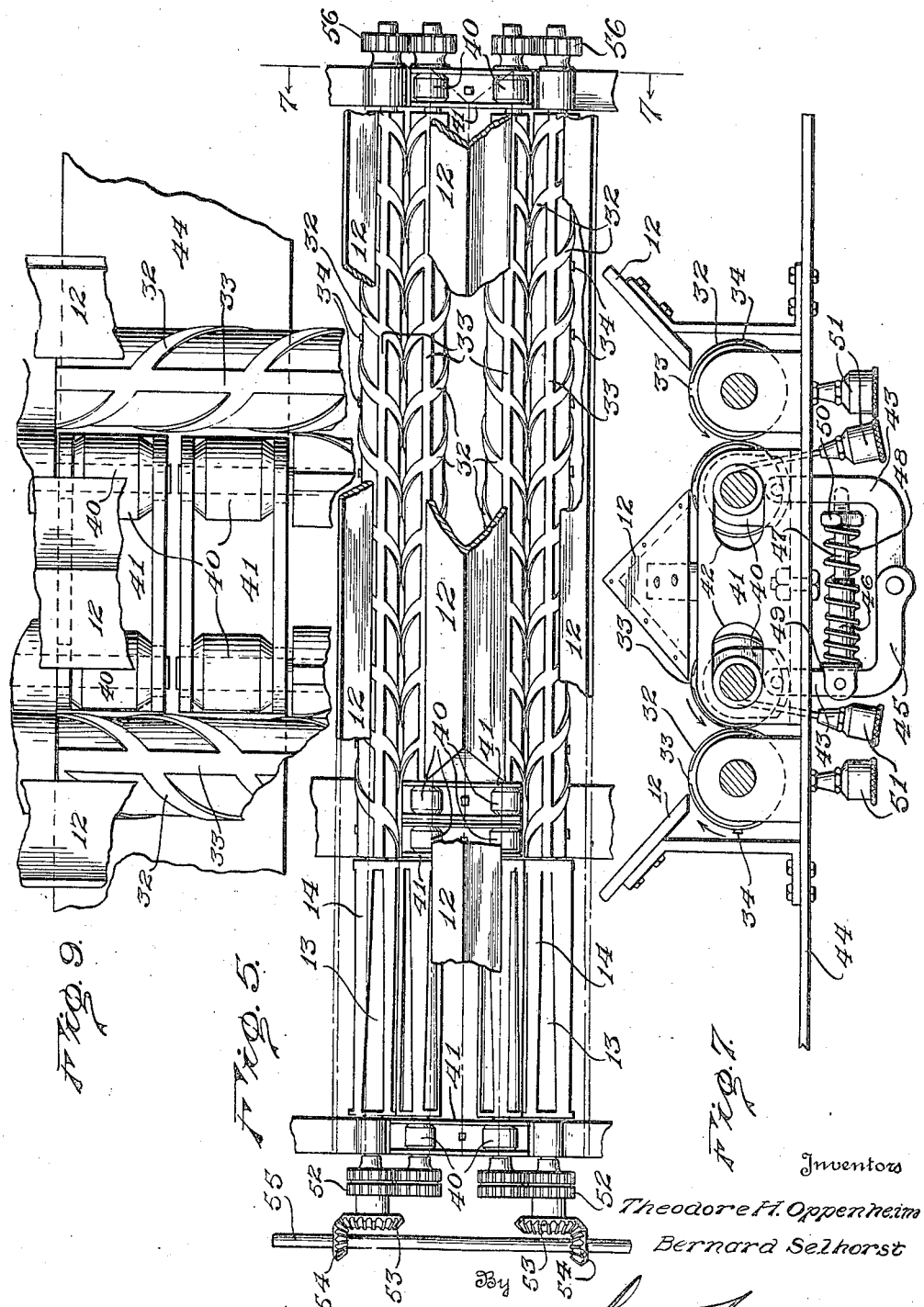

1,462,815

UNITED STATES PATENT OFFICE.

THEODORE H. OPPENHEIM AND BERNARD SELHORST, OF COLDWATER, OHIO, ASSIGNORS TO THE NEW IDEA SPREADER CO., OF COLDWATER, OHIO, A CORPORATION OF OHIO.

ROLLS FOR CORN-HUSKING MACHINES.

Application filed August 1, 1922. Serial No. 579,049.

*To all whom it may concern:*

Be it known that we, THEODORE H. OPPENHEIM and BERNARD SELHORST, citizens of the United States, residing at Coldwater, in the county of Mercer and State of Ohio, have invented certain new and useful Improvements in Rolls for Corn-Husking Machines, of which the following is a specification.

Our invention relates to corn-husking machinery and has special reference to the rolls by the operation of which the ears of corn are snapped from the stalks and the husks removed from the ears. The primary object of our invention is to provide a novel construction whereby the rolls of either set may be permitted to spread or separate so as to permit stalks or other material to pass between them without disturbing the relation of the rolls of an alined set. A further object of the invention is to provide a novel construction of the snapping rolls and also a novel construction of the husking rolls whereby the efficiency of the machine will be increased without any increase in the cost of operation or maintenance. Other incidental objects of the invention will appear in the course of the following description.

In the drawings—

Figure 1 is a side elevation of a corn-husking machine having our invention embodied therein;

Fig. 2 is a plan view with parts broken away of the snapping and husking rolls;

Fig. 3 is a side elevation of the snapping and husking rolls;

Fig. 4 is an enlarged transverse section on the line 4—4 of Fig. 2;

Fig. 5 is a plan view showing another embodiment of the invention;

Fig. 6 is a side view of the arrangement shown in Fig. 5;

Fig. 7 is an enlarged transverse section on the line 7—7 of Fig. 5;

Fig. 8 is an enlarged plan view of the snapping rolls;

Fig. 9 is an enlarged plan view of a portion of the mechanism shown in Fig. 5.

Referring more particularly to Fig. 1, there is shown a truck 1 which may be of any well-known type and is equipped at its front end with a platform 2, upon which the operator stands to place the bundles of plants upon the feeding table 3 as they are delivered by a harvesting machine or brought from the field. The feeding table may be of any well-known type and embodies an endless conveyer 4, by which the bundles are delivered to the snapping rolls 5 with their butt ends foremost. The snapping rolls and the husking rolls 6 are arranged in an inclined position upon the frame of the husking machine and below the snapping rolls is a rotary cutter 7, by the action of which the stalks and leaves are cut into small pieces to be utilized as fodder. Any shelled corn which may be separated from the ears of corn by the action of the snapping and husking rolls will also pass between and below the rolls and will drop onto screens, indicated at 8, disposed in the lower portion of the machine just above the truck 1 and oscillated by a pitman and crank 9 of any well-known type. The shelled corn will be delivered at the rear end of the screens after being separated thereby from the stalks and husks and may be caught in any suitable receptacle, while the dirt and dust will pass through to the ground. A blower 10 is provided at the rear end of the machine and communicates with a stack 11 through which the shredded stalks and husks will be blown out to any desired place of deposit.

As shown in Fig. 2, the snapping and husking rolls are arranged in pairs and preferably each snapping roll is axially alined with a husking roll. As will be readily understood upon reference to Fig. 1, the rolls are disposed longitudinally of the machine, and longitudinal guards 12 are disposed at the sides and over the central longitudinal planes of the rolls so as to spread the bundles as they are delivered to the rolls and equalize the distribution of the plants so that the load upon all the rolls will be as nearly uniform as possible. The snapping rolls are provided in their peripheral surfaces with longitudinally extending flutes or recesses 13 which taper toward their rear or lower ends and each flute or recess of one roll is disposed in opposition to the smooth or normal surface 14 of the mating roll. This construction of the snapping rolls very effectually engages the stalks and pinches the ears of corn therefrom and also feeds the ears toward the lower or rear ends of the rolls so that their passage to and onto the husking rolls will be facilitated. The provision of the flutes or channels 13 does not destroy the general cylindrical formation of the rolls which have parallel axes, and the two ends of each roll are of equal diameter and area, as will be readily understood, particularly upon reference to Fig. 8. If the rolls were tapered and set on parallel axes, a conical or wedge-shaped opening would be formed between them and, while quick feeding would then be possible, there would be a serious loss as many ears of corn would go through the opening or space between the rolls with the stalk, some untouched and some completely crushed. If tapered rolls be employed and set with their surfaces parallel at their nearest approach, the axes of the rolls would necessarily be out of parallelism and the snapping rolls could not be easily alined with the husking rolls and at the same time yieldably mounted as in our mechanism as hereinafter set forth. The rolls are rotated toward each other so that their opposed surfaces will move downwardly and thereby expedite the passage of the stalks to the space below the rolls, as will be readily understood. To effect the desired rotation of the rolls, intermeshing gears 15 are provided at the upper ends thereof, and these gears are driven by a beveled gear 16 meshing with a pinion 17 on the driving shaft 18 which is mounted in suitable bearings upon the frame of the machine above the rolls, as shown. The rolls are shown provided with extended axles or trunnions, indicated at 19, which project above the upper bearings for the rolls and the gears 15 are secured upon these axles or trunnions. The axles or trunnions may be united with the rolls in any preferred manner so that the rolls will be obliged to rotate with the axles, and, in the arrangement shown in Fig. 2, the two pairs of rolls are all driven from a single gear 16, as will be readily understood. The lower or rear ends of the snapping rolls and the upper or forward ends of the husking rolls are shown as constructed with axially extending bores or sockets in which are fitted and secured coupling pins which also serve as axles or trunnions for the rolls, and the lower ends of the husking rolls are likewise constructed with axially extending bores or sockets receiving pins 20 which constitute axles or trunnions for the rolls. The pins 20 may be of less length than the rolls and secured in only the end portions of the rolls, or they may constitute shafts passing entirely through the rolls. In the arrangement shown in Fig. 2, the inner rolls have their axles or trunnions journaled in bearings 21 disposed transversely upon the frame and held in a fixed position through any preferred securing means, while the outer rolls are fitted in slidably mounted bearings whereby the said outer rolls may move outwardly to a limited extent to permit the passage of the stalks or of the husks, as the case may be. The slidable bearings are illustrated most clearly in Fig. 4 and consist of yokes or boxes 22 slidably fitted in casings 23 projecting outwardly from the bearings and secured upon or forming a part of the main frame of the machine, the bearings being held against rotation in the casings by the engagement of their flattened upper and lower sides with the top and bottom walls of the casings, as will be readily understood upon reference to Fig. 4. The bearings or boxes 22 are provided upon their upper and lower sides with studs 24 playing in slots 25 in the casings and pins 26 project outwardly from the boxes to engage in and be guided by sleeves 27 disposed within the casings and adjustably supported therein by set bolts 28 mounted in the ends of the casings, as clearly shown. A spring 29 is coiled around each sleeve 27 and bears at one end against the corresponding box 22 and at its opposite end against a collar or other abutment 30 upon the sleeve so that the box is normally yieldably held in its inner position, as shown and as will be understood. The mounting just described and illustrated in detail in Fig. 4 is duplicated at the upper ends of the snapping rolls as well as at the lower ends of the husking rolls, and is also employed at the opposed ends of the rolls.

The husking rolls have their upper ends tapered, as shown at 31, so that they will present the minimum resistance to the passage of the ears of corn thereover and will also guide the ears into the bight of the rolls. Each husking roll is provided peripherally with a spiral rib or bead 32 extending from end to end thereof and the successive convolutions of the spiral bead are connected by a longitudinal rib or breaker bar 33, the said spiral ribs and the breaker bar being preferably formed integral with the body of the roll. It will be readily noted that recesses of rhomboidal form are thus produced upon the surfaces of the rolls which will accommodate the husks and shelled corn and permit them to pass between the rolls. It will also be noted upon reference to Fig. 2 that the helical or spiral ribs are reversed and so arranged upon the mating rolls that the surface of the rib upon one roll will be constantly in contact with the surface of the rib upon the mating roll and the breaker bars will always come together in the bight of the rolls so that a positive and effectual engagement of the husks will be attained. To insure the loosening of the husks from the corn and the effectual separation of the husks and silk from the ears, we provide means for biting into the husks as the same are received upon the husking rolls. This means consists of lugs or teeth 34 provided upon the rolls at the centers of some of the rhomboidal recesses 35 provided by the arrangement of the ribs and the breaker bars, and these teeth or lugs project slightly beyond the surface of the adjacent rib or breaker bar so that, as the rotation of the rolls presents the lugs to the mating roll, they will extend slightly into the recesses upon the mating roll and thereby cut through the husks and effect a positive engagement therewith so that the husks will be drawn cleanly and quickly from the ears. To insure positive rotation of the husking rolls, a train of gearing 36 is provided at the lower ends thereof, as shown clearly in Fig. 2.

It will be readily noted that the axles or trunnions at the lower end of an outer snapping roll and the upper end of an outer husking roll, in the form of the invention shown in Fig. 2, do not constitute a coupling between these rolls, although they do extend into the respectively adjacent bearing boxes. This arrangement permits relative movement of the opposed ends of the rolls so that the snapping roll, for instance, may yield to an unusually large stalk without disturbing the relative positions of the mating husking rolls and likewise the outer husking roll may move outwardly from its mating husking roll without disturbing the relative positions of the upper snapping rolls. The trunnions or axles of the inner snapping rolls and husking rolls do, however, constitute coupling pins passing through the central stationary bearings 21, as clearly shown in Fig. 2. The bearing 21, however, presents a slight obstruction to the passage of the ears of corn, which is not serious but may be objectionable to some users. To meet this objection, we may omit the central bearing and elongate the inner husking rolls so that their upper ends will be in juxtaposition to the lower ends of the snapping rolls and receive the ears directly therefrom, or we may employ the arrangement shown in Fig. 5, in which the outer snapping roll is coupled to the alined husking roll and the inner snapping roll and husking roll are yieldable. In this arrangement, the lower trunnion of a snapping roll and the upper trunnion of a husking roll are fitted in rocker bearings 40 which are disposed within channels or other suitable guides 41 provided with longitudinal slots 42 in their sides to permit relative lateral movement of the trunnions. To each rocker bearing 40 is attached an arm 43 which extends downwardly through the supporting plate 44 and has its lower end turned inwardly, as shown at 45, to be pivotally connected with the inwardly turned lower end of the mating arm. Pivotally attached to one arm 43 is a sleeve 46 receiving the inner end of a pin 47 carried by the mating arm 43, and a spring 48 is coiled around the said sleeve and pin and bears at one end against a shoulder 49 on the sleeve and at its opposite end upon an abutment or nut 50 adjustably mounted upon the pin 47. It will be readily seen that this construction permits the bearings to move inwardly and yield to the load imposed thereon, while at the same time the bearings are normally held in their outer positions so that the rolls are held close together. All the bearings in both forms of the invention are equipped with force feed cups 51 whereby a heavy lubricant may be fed to the moving surfaces to minimize the wear and insure easy rotation of the parts at all times. It will also be noted that, in the last described form of the invention, each pair of rolls is driven by a train of gearing 52 independent of the other, and each train of gearing is actuated by a gear 53 meshing with a pinion 54 upon the driving shaft 55. This form of driving gearing will permit one pair of rolls to be used in the event that some breakage in the driving gearing for the other pair of rolls should occur, but either form of driving gearing may be used as may be preferred. The lower ends of the husking rolls are connected by trains of gearing 56, as shown and as will be readily understood. It will be readily noted, upon reference to Figs. 5 and 9, that when the husking rolls are elongated so that their upper ends meet or are in the same transverse plane with the lower ends of the snapping rolls, the ribs and breaker bars extend to the snapping rolls. With this arrangement, the spiral ribs tend to work out the husks which may gather at the yieldable bearings, and also accelerate the downward movement of the ears.

The action of the rolls upon the corn in both forms of the invention is the same. The snapping rolls pinch the ears of corn from the stalks and the husking rolls strip the husks from the ears, the stripped ears passing from the lower ends of the husking rolls to a conveyer 60 by which they are delivered into any suitable receptacle or stored in a bin, as will be readily understood. In the husking machines now generally employed, all the snapping rolls are connected directly with the husking rolls so that, when the snapping rolls spread, the husking rolls are forced to spread. As a result of this action, while the ears are traveling down the husking rolls, the husking rolls will frequently spread apart and, therefore, fail to effectually engage the husks so that many ears eventually leave the husking rolls with the husks or leaves unstripped. By the use of our improved rolls, the spreading or yielding of the snapping rolls does not compel a separation or spreading of the husking rolls and the husking rolls effectually engage the husks and strip the same from the ears irrespective of the action of the snapping rolls. In Fig. 5, we have shown the outer snapping roll as formed integral with the alined husking roll, but it will be understood that this construction is not essential. The guards disposed above the rolls at the centers and at the sides of the sets or gangs of rolls prevent the ears from falling between the rolls in addition to serving as a means for dividing the bundles so as to evenly distribute the load upon the rolls. The bearings automatically adjust themselves to the position of the rolls so that there is no binding effect and, therefore, no liability of the rolls choking while at work. The tapered flute construction of the snapping rolls permits the stalks to readily enter the bight of the rolls, as the butts of the stalks will be presented to the wider ends of the flutes and the stalks will be positively fed through between the rolls by the engagement of the edges of the flutes with the stalks. The stalks will always be fed toward the lower ends of the rolls where the flutes are narrower and will snap the ears from the stalk without shelling the ears. As each flute on one roll is confronted by a normal circumferential surface on the mating roll, an abrupt edge is presented to the stalk to engage the same and pull it through the bight of the rolls while, at the same time, a smooth support is provided for the ear snapped from the stalk by the abrupt edge, while the stalk is very tightly gripped. Moreover, the ears are snapped from the stalk without any shelling or waste of corn. The construction of the husking rolls has been found to be very effectual. The spiral ribs obtain a very efficient hold upon the husks and the breaker bars break off the butts of the ears so that none of the ears pass down the rolls in an upright position and leave the same in an unhusked condition. The formation of the breaker bars and the spiral ribs which ride in contact with each other produces shallow recesses which permit any corn which may possibly be shelled from the ears to pass between the rolls without being crushed, and the lugs or teeth upon the rolls effect a direct engagement with the husks so that they are loosened before being engaged by the breaker bars and the work of the breaker bars is thus facilitated and made more efficient.

In Figs. 4 and 7, the axes of all the rollers are shown located upon a straight line but this arrangement may be varied and either the inner or the outer rolls may be set higher than their mating rolls. Other changes in the form or arrangement of the parts may be made without departing from the spirit or scope of the invention as the same is defined in the appended claims.

Having thus described the invention, what is claimed as new is:

1. In a corn-husking machine, a pair of husking rolls each provided upon its circumferential surface with a spiral rib and longitudinal breaker bars, the breaker bars connecting the successive convolutions of the spiral rib and the ribs on mating rolls being reversed relative to each other and so arranged as to have their circumferential surfaces constantly in contact in the bight of the rolls, the opposed breaker bars meeting in the bight of the rolls.

2. In a corn-husking machine, a pair of husking rolls each provided upon its circumferential surface with a spiral rib and longitudinal breaker bars, the rib and bars defining a plurality of shallow recesses throughout the circumference of the roll and the ribs being reversed relative to each other and opposed on the mating rolls whereby their circumferential surfaces will be constantly in contact in the bight of the rolls and the breaker bars will meet in said bight, projections at the centers of some of the recesses defined by the ribs and bars arranged to enter the similar recesses on the mating roll, and means for rotating said rolls in opposite directions with their opposed surfaces moving downwardly.

3. In a corn-husking machine, a substantially cylindrical snapping roll provided with longitudinally extending flutes gradually decreasing in width toward the delivery end of the roll.

4. In a corn-husking machine, a pair of snapping rolls having parallel axes and each provided in its circumferential surface with longitudinally extending flutes gradually decreasing in width toward the delivery end of the roll, the flutes upon one roll being opposed to the unfluted surface of the mating roll.

5. In a corn-husking machine, the combination of normally alined snapping rolls and husking rolls, and independent bearings for the opposed ends of some of the snapping rolls and husking rolls, said bearings being yieldably held normally in alinement.

6. In a corn-husking machine, the combination of pairs of snapping rolls, pairs of husking rolls arranged below the pairs of snapping rolls, fixed bearings for one roll of each pair whereby said rolls will be held in fixed axial alinement, and yieldably mounted bearings for the ends of the mating rolls of each pair whereby they will be normally held in axial alinement and either of them may yield to abnormal stress without affecting the normally alined roll.

In testimony whereof we affix our signatures.

THEODORE H. OPPENHEIM. [L. S.]
BERNARD SELHORST. [L. S.]